United States Patent
Oxenham et al.

(10) Patent No.: US 10,514,262 B2
(45) Date of Patent: Dec. 24, 2019

(54) INTERACTIVE VENUE SEAT MAP

(71) Applicant: eBay Inc., San Jose, CA (US)

(72) Inventors: Oliver Oxenham, Singapore (SG); Wesley Allan Oxenham, Singapore (SG)

(73) Assignee: EBAY INC., San Jose, CA (US)

( * ) Notice: Subject to any disclaimer, the term of this patent is extended or adjusted under 35 U.S.C. 154(b) by 80 days.

(21) Appl. No.: 15/490,890

(22) Filed: Apr. 18, 2017

(65) Prior Publication Data

US 2017/0219355 A1    Aug. 3, 2017

Related U.S. Application Data

(63) Continuation of application No. 13/559,979, filed on Jul. 27, 2012, now abandoned.

(51) Int. Cl.
| | |
|---|---|
| *G01C 21/20* | (2006.01) |
| *G01S 19/42* | (2010.01) |
| *G06F 16/29* | (2019.01) |
| *G06Q 10/02* | (2012.01) |

(52) U.S. Cl.
CPC .......... *G01C 21/206* (2013.01); *G01S 19/42* (2013.01); *G06Q 10/02* (2013.01); *G06F 16/29* (2019.01)

(58) Field of Classification Search
CPC ...... G01C 21/206; G01S 19/42; G06Q 10/02; G06F 16/29
See application file for complete search history.

(56) References Cited

U.S. PATENT DOCUMENTS

| | | | | |
|---|---|---|---|---|
| 6,490,519 B1 * | 12/2002 | Lapidot | .................. | G01C 21/34 |
| | | | | 340/905 |
| 7,263,375 B2 * | 8/2007 | Zavada | ................. | H04W 64/00 |
| | | | | 342/357.52 |
| 8,024,234 B1 * | 9/2011 | Thomas | ................. | G06Q 10/02 |
| | | | | 705/26.1 |
| 8,139,514 B2 * | 3/2012 | Weber | .................... | H04L 67/24 |
| | | | | 370/312 |
| 8,195,598 B2 * | 6/2012 | Hua | ......................... | G06N 5/02 |
| | | | | 706/62 |

(Continued)

FOREIGN PATENT DOCUMENTS

WO      20120844549 A1    6/2012

OTHER PUBLICATIONS

Klaus Wehrle, "FootPath: Accurate Map-based Indoor Navigation Using Smartphones", published by IEEE, in 2011 (Year: 2011).*

(Continued)

*Primary Examiner* — Kevin H Flynn
*Assistant Examiner* — Omar Zeroual
(74) *Attorney, Agent, or Firm* — Maschoff Brennan

(57) ABSTRACT

Methods and systems provide an interactive venue seat map that shows where a user's contacts or friends are sitting to help the user select seats when purchasing tickets for an event, such as a concert or sporting event. The tickets can be purchased from an online ticket seller, such as StubHub, Inc. Information regarding where the friends are sitting can be obtained from a ticker server of the online ticket seller, a social network, or a list of contacts. The interactive venue map can show the seats or sections where the friends are sitting using photos of the friends. The user can use the map to determine which seats the user would like to purchase.

20 Claims, 9 Drawing Sheets

(56) References Cited

U.S. PATENT DOCUMENTS

| | | | | |
|---|---|---|---|---|
| 8,359,344 B2* | 1/2013 | Das | G01C 21/00 | 707/707 |
| 8,427,510 B1* | 4/2013 | Towfiq | G09G 5/391 | 345/654 |
| 8,464,181 B1* | 6/2013 | Bailiang | G06F 3/04815 | 715/848 |
| 8,538,389 B1* | 9/2013 | Evans | H04L 67/18 | 455/414.1 |
| 8,538,688 B2* | 9/2013 | Prehofer | G01C 21/3484 | 340/995.14 |
| 8,635,023 B2* | 1/2014 | Friedler | G01C 21/20 | 701/495 |
| 8,676,615 B2 | 3/2014 | Callaghan et al. | | |
| 8,818,706 B1* | 8/2014 | Ogale | G01C 21/206 | 340/539.1 |
| 8,849,308 B2* | 9/2014 | Marti | H04W 4/043 | 455/456.2 |
| 8,896,630 B1* | 11/2014 | Miller | G06T 3/40 | 345/636 |
| 8,930,134 B2* | 1/2015 | Gu | G06Q 30/0205 | 701/434 |
| 9,204,251 B1* | 12/2015 | Mendelson | G08G 1/14 | |
| 9,342,930 B1* | 5/2016 | Kraft | G06T 19/006 | |
| 9,539,164 B2* | 1/2017 | Sanders | G01C 21/206 | |
| 9,619,124 B2* | 4/2017 | Morrison | G06F 3/04842 | |
| 10,049,401 B2* | 8/2018 | Nair | G06Q 30/0639 | |
| 10,102,564 B2* | 10/2018 | Pellow | G01C 21/206 | |
| 2002/0082879 A1* | 6/2002 | Miller | G06Q 10/02 | 705/5 |
| 2002/0168084 A1* | 11/2002 | Trajkovic | G06K 9/00778 | 382/100 |
| 2004/0006497 A1 | 1/2004 | Nestor et al. | | |
| 2004/0181438 A1 | 9/2004 | Hoene et al. | | |
| 2006/0270421 A1 | 11/2006 | Phillips et al. | | |
| 2007/0124259 A1 | 5/2007 | Sussman et al. | | |
| 2007/0191026 A1* | 8/2007 | Teplitsky | G01C 21/20 | 455/456.3 |
| 2007/0197229 A1* | 8/2007 | Kalliola | H04W 4/029 | 455/456.1 |
| 2007/0219711 A1* | 9/2007 | Kaldewey | G01C 21/00 | 701/434 |
| 2007/0265892 A1* | 11/2007 | Valentino | G06Q 10/02 | 705/5 |
| 2008/0062167 A1* | 3/2008 | Boggs | G06F 17/5004 | 345/419 |
| 2008/0288886 A1* | 11/2008 | Sherwood | G06F 16/9024 | 715/772 |
| 2009/0043502 A1* | 2/2009 | Shaffer | G01C 21/20 | 701/469 |
| 2009/0063208 A1 | 3/2009 | Stirlen et al. | | |
| 2009/0077000 A1* | 3/2009 | Begole | G06Q 10/10 | 706/54 |
| 2009/0132941 A1* | 5/2009 | Pilskalns | G06F 16/9537 | 715/764 |
| 2009/0138353 A1* | 5/2009 | Mendelson | G01C 21/206 | 705/14.39 |
| 2009/0239552 A1* | 9/2009 | Churchill | G06F 16/9537 | 455/456.3 |
| 2009/0248457 A1 | 10/2009 | Munter et al. | | |
| 2009/0259498 A1* | 10/2009 | Halavais | G06Q 10/02 | 705/5 |
| 2009/0265251 A1* | 10/2009 | Dunlap | G06Q 10/087 | 705/26.1 |
| 2009/0319306 A1* | 12/2009 | Chanick | G01C 21/3679 | 705/5 |
| 2009/0325595 A1* | 12/2009 | Farris | H04W 4/021 | 455/456.1 |
| 2010/0015993 A1* | 1/2010 | Dingler | G06Q 10/109 | 455/456.1 |
| 2010/0017733 A1* | 1/2010 | Barros | G06F 3/04847 | 715/766 |
| 2010/0023252 A1* | 1/2010 | Mays | G01C 21/20 | 701/533 |
| 2010/0133339 A1* | 6/2010 | Gibson | G06Q 10/02 | 235/382 |
| 2010/0153142 A1 | 6/2010 | Vasudevan et al. | | |
| 2010/0198626 A1* | 8/2010 | Cho | G06Q 10/02 | 705/5 |
| 2010/0250561 A1* | 9/2010 | Nishiyama | G06F 3/04817 | 707/754 |
| 2011/0087506 A1 | 4/2011 | Barillec et al. | | |
| 2011/0105092 A1* | 5/2011 | Felt | H04M 3/42348 | 455/414.1 |
| 2011/0106896 A1* | 5/2011 | Baransky | H04W 4/21 | 709/206 |
| 2011/0144903 A1* | 6/2011 | Gupta | G01C 21/206 | 701/533 |
| 2011/0184945 A1* | 7/2011 | Das | G01C 21/206 | 707/724 |
| 2011/0246148 A1* | 10/2011 | Gupta | H04W 64/00 | 703/2 |
| 2011/0276385 A1* | 11/2011 | Keller | G06Q 20/202 | 705/14.38 |
| 2011/0289106 A1* | 11/2011 | Rankin, Jr. | G06Q 10/10 | 707/769 |
| 2012/0023034 A1* | 1/2012 | Lynch | G06Q 30/0281 | 705/346 |
| 2012/0029691 A1 | 2/2012 | Mockus et al. | | |
| 2012/0066035 A1* | 3/2012 | Stanger | G06Q 30/0207 | 705/14.1 |
| 2012/0078667 A1* | 3/2012 | Denker | G06Q 10/02 | 705/5 |
| 2012/0166231 A1 | 6/2012 | Denker et al. | | |
| 2012/0191510 A1 | 7/2012 | Cameron | | |
| 2012/0197696 A1 | 8/2012 | Beyeler et al. | | |
| 2012/0214515 A1* | 8/2012 | Davis | H04W 4/023 | 455/456.3 |
| 2012/0221362 A1 | 8/2012 | Nezer et al. | | |
| 2012/0259732 A1* | 10/2012 | Sasankan | G01S 5/0205 | 705/26.9 |
| 2012/0295632 A1* | 11/2012 | Karlsson | H04W 4/021 | 455/456.1 |
| 2012/0317205 A1* | 12/2012 | Lahiani | G06Q 10/10 | 709/206 |
| 2012/0323488 A1 | 12/2012 | Callaghan | | |
| 2012/0323612 A1 | 12/2012 | Callaghan | | |
| 2013/0023284 A1* | 1/2013 | Stanger | G06Q 30/0259 | 455/456.1 |
| 2013/0101159 A1* | 4/2013 | Chao | G06K 9/00771 | 382/103 |
| 2013/0122941 A1* | 5/2013 | Das | H04W 64/00 | 455/456.5 |
| 2013/0124234 A1 | 5/2013 | Nilsson et al. | | |
| 2013/0141565 A1* | 6/2013 | Ling | H04N 7/18 | 348/135 |
| 2013/0182891 A1* | 7/2013 | Ling | G01C 21/206 | 382/103 |
| 2013/0191246 A1* | 7/2013 | Calman | G06Q 30/0639 | 705/26.9 |
| 2013/0238234 A1* | 9/2013 | Chao | G01C 21/206 | 701/409 |
| 2013/0260790 A1* | 10/2013 | Itzhaki | H04W 4/029 | 455/456.1 |
| 2013/0268400 A1* | 10/2013 | Ballard | G06Q 30/0641 | 705/26.8 |
| 2013/0268899 A1* | 10/2013 | Valentino | G06Q 10/02 | 715/852 |
| 2013/0297205 A1* | 11/2013 | Kim | G01C 21/206 | 701/523 |
| 2013/0325337 A1* | 12/2013 | Rudenstine | G06F 3/0484 | 701/527 |
| 2013/0342565 A1* | 12/2013 | Sridhara | G01C 21/206 | 345/629 |
| 2013/0346204 A1* | 12/2013 | Wissner-Gross | G06Q 30/0281 | 705/14.58 |
| 2014/0032250 A1 | 1/2014 | Oxenham et al. | | |

(56) References Cited

U.S. PATENT DOCUMENTS

| | | | |
|---|---|---|---|
| 2014/0046802 A1* | 2/2014 | Hosein | G01R 1/06711 |
| | | | 705/26.61 |
| 2014/0162693 A1* | 6/2014 | Wachter | H04W 4/04 |
| | | | 455/456.3 |
| 2014/0171068 A1* | 6/2014 | Marti | G01S 1/047 |
| | | | 455/427 |
| 2015/0052460 A1* | 2/2015 | Mohammad Mirzaei | |
| | | | G06F 3/0484 |
| | | | 715/764 |
| 2016/0189273 A1* | 6/2016 | Eramian | H04W 4/029 |
| | | | 705/26.7 |
| 2018/0234805 A1* | 8/2018 | DeLuca | H04W 4/029 |

OTHER PUBLICATIONS

International Search Report and Written Opinion dated Dec. 9, 2013 in related PCT Application No. PCT/US2013/051716 (5 pages).

Non-Final Office Action received for U.S. Appl. No. 13/559,979, dated Aug. 26, 2014, 10 pgs.

Response to Non-Final Office Action filed Nov. 26, 2014 for U.S. Appl. No. 13/559,979, 15 pgs.

Final Office Action received for U.S. Appl. No. 13/559,979, dated Jan. 13, 2015, 18 pgs.

Response to Final Office Action filed Apr. 13, 2015 for U.S. Appl. No. 13/559,979, 17 pgs.

Non-Final Office Action received for U.S. Appl. No. 13/559,979, dated Jun. 4, 2015, 26 pgs.

Response to Non-Final Office Action filed Sep. 4, 2015 for U.S. Appl. No. 13/559,979, 20 pgs.

Final Office Action received for U.S. Appl. No. 13/559,979, dated Dec. 3, 2015, 27 pgs.

Response to Final Office Action filed on Mar. 3, 2016 for U.S. Appl. No. 13/559,979, 21 pgs.

Non-Final Office Action received for U.S. Appl. No. 13/559,979, dated May 5, 2016, 32 pgs.

Response to Non-Final Office Action filed Aug. 3, 2016 for U.S. Appl. No. 13/559,979, 17 pgs.

Final Office Action received for U.S. Appl. No. 13/559,979, dated Nov. 18, 2016, 30 pgs.

Response to Final Office Action filed Jan. 25, 2017 for U.S. Appl. No. 13/559,979, 18 pgs.

Advisory Action received for U.S. Appl. No. 13/559,979 dated Feb. 3, 2017, 3 pgs.

First Examination Report received for Australian Patent Application No. 2016244282, dated Jul. 13, 2017, 5 pgs.

Response to First Examination Report filed Apr. 27, 2018, for Australian Patent Application No. 2016244282, 21 pgs.

Notice of Acceptance received for Australian Patent Application No. 2016244282, dated May 29, 2018, 3 pgs.

Office Action received for Canadian Patent Application No. 2,876,932, dated May 3, 2019, 3 pgs.

* cited by examiner

INTERACTIVE VENUE SEAT MAP

CROSS-REFERENCE TO RELATED APPLICATIONS

This application is a continuation of U.S. patent application Ser. No. 13/559,979, filed on Jul. 27, 2012; the disclosure of this application is incorporated by reference herein.

BACKGROUND OF THE INVENTION

1. Technical Field

The present disclosure generally relates to electronic commerce and, more particularly, relates to the use of an interactive venue seat map that shows where a user's friends are sitting to help the user select seats when purchasing event tickets, such as for concerts and sporting events.

2. Related Art

The online purchasing of tickets for various events is common. For example, tickets for concerts and sporting events can be purchased from an online ticket seller, such as StubHub, Inc. The tickets can be paid for via a payment provider account, such as that offered by Paypal, Inc. After being paid for, the purchased tickets can then be mailed to the customer w or can sometimes be printed by the customer.

Typically, a customer must select one or more seats when purchasing such tickets. Whether the tickets are being purchased online or from a brick and mortar merchant, a venue map is generally provided to help the customer select the seats. The venue map usually shows the different seating areas and their relationship to an attraction area, such as a stage, game court, or field. Ticket prices for each seating area are provided, either on the map or elsewhere. Thus, a customer can use the venue map to help determine which seats the customer would like to purchase for a particular event.

For example, a more dedicated football fan may be willing to pay more for seats closer to the field than a less dedicated football fan. Further, the venue map can help a customer decide what part of the field the customer wants to be near. The more dedicated football fan may prefer to be close to center field.

DETAILED DESCRIPTION

Figure 1:
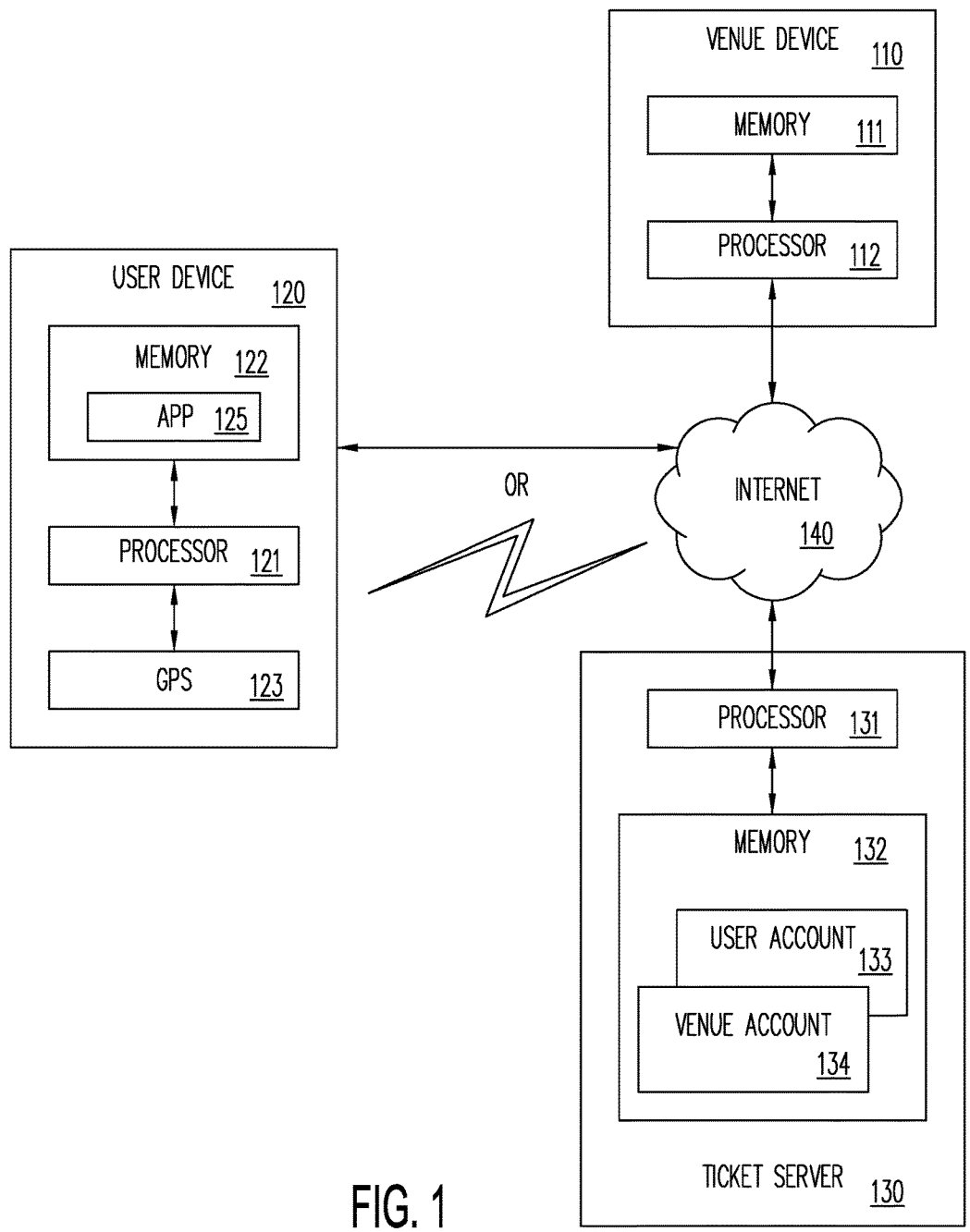
FIG. 1 is a block diagram of a system for providing an interactive venue seat map, according to an embodiment.

Methods and systems provide an interactive venue seat map that shows where a user's contacts or friends are sitting to help the user select seats when purchasing tickets for an event, such as a concert or sporting event. The tickets can be purchased from an online ticket seller, such as StubHub, Inc. Information regarding where the friends are sitting can be obtained from a ticker server of the online ticket seller. The map can be generated by the ticket server.

A list of the friends can be obtained from a social network such as LinkedIn, or Facebook. The list of the friends can be obtained from a list of contacts, such as Contact List (provided by Yahoo! Inc.). The list of the friends can be obtained from any electronic, computer, network of other such source. The interactive venue map can show the seats or sections where the friends are sitting using photos of the friends. The user can use the map to determine which seats the user would like to purchase.

According to an embodiment, a system can comprise a memory storing information regarding seats at a venue and corresponding information regarding people who have tickets to sit in the seats during an event. One or more processors can be operable to receive a communication including an indication of a desire of a user to purchase tickets for the event, determine at least one friend of the user and the seat(s) of the friend(s) for the event, and send to the user information identifying the friend(s) and the seat(s) of the friend(s).

The system can determine the friend(s) by accessing a list of friends stored in the memory, for example. The processor(s) can receive a list of friends from the user during a setup procedure and can store the list of friends in the memory. The processor(s) can receive a list of friends in the communication. The processor(s) can obtain a list of friends by querying at least one social network. The processor(s) can perform one or more (such as at least two) of the steps of receiving a list of friends from the user during a setup procedure, receiving a list of friends in the communication, and obtaining a list of friends by querying at least one social network.

The processor(s) can make a map of the venue showing pictures of the friend(s) at locations on the map of seats of the friend(s) and can send the map to the user. The map can show various features of the venue, as specified by the user and discussed herein. The map can be interactive such that the user can dynamically modify what the map shows.

According to an embodiment, a method can include storing, such as in a memory, information regarding seats at a venue and corresponding information regarding people who have tickets to sit in the seats during an event. The method can include receiving, such as via one or more processors, a communication including an indication of a desire of a user to purchase tickets for the event, determining, such as via the processor(s), at least one friend of the user and the seat(s) of the friend(s) for the event, and sending, such as via the processor(s), to the user information identifying the friend(s) and the seat(s) of the friend(s).

The determining of the friends can include accessing a list of friends stored in the memory. The method can further include receiving, such as via the processor(s), a list of friends from the user during a setup procedure and storing, such as via the processor(s), the list of friends in the memory.

The method can further include receiving, such as via the processor(s), a list of friends in the communication. The method can further include obtaining, such via the processor(s), a list of friends by querying at least one social network.

The method can further include one or more of the steps of receiving, via the processor(s), a list of friends from the user during a setup procedure, receiving, via the processor(s), a list of friends in the communication, and obtaining, via the processor(s), a list of friends by querying at least one social network.

The method can further include making, via the processor(s), a map of the venue showing pictures of the friend(s) at locations on the map of seats of the friend(s) and sending, via the processor(s), the map to the user. The map can show any desired features of the venue, the surrounding area, routes within or outside of the venue, or anything else. The map can be changed dynamical or interactively, such as substantially in real time.

According to an embodiment, a computer program product can comprise a non-transitory computer readable medium having computer readable and executable code for instructing one or more processors to perform the method.

Methods and systems are provided for allowing a user to more easily select seats that are desirable to the user at event venues. According to an embodiment, the user can select a venue for which the user wants to purchase event tickets. Seating preferences of the user can have been pre-stored, such as with a ticket server. The ticket server can present the user with a map that shows those seats or seating areas that meet or are consistent at least some of the user's preferences. The user can use the map to determine which seats the user would like to purchase.

According to an embodiment, a system can comprise a memory configured to store information regarding a plurality of venues. The information can include at least one user preference for at least one of the venues. One or more processors can be operable to receive a communication including an indication of a desire of a user to purchase tickets for an event at a selected one of the venues. The processor(s) can determine, via the memory, at least one user preference for the selected one of the venues. The processor(s) can send to the user information regarding an availability of seats consistent with the at least one user preference.

According to an embodiment, at least one of the user preferences can be provided to the system by the user. The user can provide the preference(s) to the system during a user preference set up procedure, for example. The user can provide the preference(s) to the system when purchasing tickets. The use of such preferences by the system to provide the user with seats can be on a one time basis or can be for use with a plurality of ticket purchases by the user.

According to an embodiment, at least one of the user preferences can be determined by the system based upon user seating history. The system can use a purchase history of the user at the venue for which tickets are currently being purchased to determine or infer user preferences. The system can use a purchase history of the user at different venue from the venue for which tickets are currently being purchased to determine or infer user preferences. The system can use a purchase history of the user from a plurality of venues for which tickets have previously been purchased to determine or infer user preferences.

According to an embodiment, the user preference(s) can comprise seating criteria preferences for the selected one of the venues. The user preference(s) can include distance from an attraction area (such as a stage, arena, court or field), an ability to see an attraction area, an ability to see a specified part of the attraction area, an include ability to see the entire attraction area, an ability to hear sound from the attraction area, and/or a type of the seat (hard, padded, folding, box, etc.). The user preference(s) can include any criteria that the user can use to decide which seats for the user would like to purchase tickets.

According to an embodiment, the user preferences can include seating area preferences for the selected venue. The user preferences can include specific seats for the selected venue. The user preferences can include both seating area preferences for the selected venue and specific seats for the selected venue. For example, the user preference can be for specific seats, but can be for the seating area of the specific seats if the specific seats are not available.

According to an embodiment, the user preference(s) can be negative preferences. Negative preferences can be preferences that something not be true. For example, a negative preference can be a preference that the user not sit near a food stand, beverage stand, or restroom.

According to an embodiment, the user preferences can include seating preferences for the plurality of venues generally. The user preferences can include seating criteria preferences for the plurality of venues generally.

According to an embodiment, the processor(s) can determine, via the memory, one user preference for the selected one of the venues and the processors can send to the user information regarding an availability of seats consistent with the one user preference. Alternatively, the processor(s) can determine, via the memory, a plurality of user preferences for the selected one of the venues and the processors can send to the user information regarding an availability of seats consistent with the one plurality of user preferences. As yet a further alternative, the processor(s) can determine, via the memory, all of the user preferences for the selected one of the venues and the processor(s) can send to the user information regarding an availability of seats consistent with all of the user preferences.

According to an embodiment, the processor(s) can send to the user a map showing an availability of seats consistent with the one user preference. Alternatively, the processor(s) can send to the user a map showing an availability of seats consistent with a plurality of the user preferences. As yet a further alternative, the processor(s) can send to the user a map showing an availability of seats consistent with all of the user preferences.

The map can use color coding to indication which seats are more consistent with the user preferences. For example, one color can indicate that a seat is consistent with one of the user preferences, another color can indicate that a seat is consistent with two of the user preferences, and yet another color can indicate that a seat is consistent with all of the user preferences. Thus, the color can depend upon how many of the user preferences are meet.

According to an embodiment, a method can include storing, in a memory, information regarding a plurality of venues, including at least one user preference for at least one of the venues. A communication can be received via the one or more processors and the communication can include an indication of a desire of a user to purchase tickets for an event at a selected one of the venues. At least one user preference for the selected one of the venues can be determined via the one or more processors. Information regarding an availability of seats consistent with the at least one user preference can be sent to the user via the one or more processors.

A seat can be considered to be consistent with a preference if the seat meets the preference. For example, if the preference is to be within 50 feet of the stage, then all seats within 50 feet of the stage are consistent with this preference. If a seat cannot be found that is consistent with a particular preference, then the ticket server 130 can present the user with seats that come as close to being consistent with that preference as possible. For example, if the preference is to be within 50 feet of the stage, but the closest available seats are 65 feet from the stage, then the seats 65 feet from the stage can be presented to the user with the information that these are the closest available seats.

According to an embodiment, computer readable and executable code for instructing the processor(s) to perform the method can be recorded on a non-transitory computer readable medium. For example, the method can be recorded on a hard drive, a solid state drive, magnetic tape, or optical storage media. The method can be recorded on any desired type of non-transitory computer readable medium.

The map can show any desired combination of friends and features. The user can pre-define a desired combination of friends and features to be shown on the map. The user can interactively change the combination of friends and features shown on the map FIG. 1 is a block diagram showing a venue seat and feature map system, according to an embodiment. A venue device 110 can be present at each of a plurality of different event venues. The venue device 110 can provide information regarding events scheduled to be at the venue, regarding seating at the venue, and regarding features of the venue. The venue device 110 can provide such information to a ticker server 130. The ticket server 130 can obtain information regarding events scheduled to be at various venues, information regarding seating, and information regarding features of the various venues from other sources.

The venue device 110 can be a computer, a server, a computing tablet, or a mobile device, for example. The venue device 110 can have a processor 111 and a memory 112. The processor 110 can execute a software program stored in the memory 112 for providing information regarding events scheduled to be at the venue, regarding seating, and regarding features of the venue. The venue device 110 can provide such information to the ticket server and/or to a user device 120.

The venue device 110 can be disposed at the venue. The venue device 110 can be disposed at a location other than the venue. Each venue can have a dedicated venue device 110. A plurality of different venues can share a common venue device 110. For example, co-owned venues can share a common venue device 110.

The user can have the user device 120. The user device 120 can be a mobile device such as a cellular telephone, a tablet computer, a laptop computer, or the like. The user device 120 can be a non-mobile device such as a home (land line) telephone, a table top computer, an interactive set top box, or the like. The user device 120 can be any device or combination of devices that facilitate online ticket purchasing.

The user device 120 can have a processor 121, a memory 122, and a global positioning system (GPS) 123. The processor 121 can execute an application or app 125 that facilitates the venue seat and feature map method disclosed herein. The app 125 can be stored in the memory 122. The app 125 can provide a graphical user interface (GUI) for the user when purchasing tickets online. The app 125 can be a dedicated ticket purchasing app. The app 125 can be part of another app, such as a Paypal payment provider app.

The user device 120 can communicate with the venue device 110 and/or the ticket server 130 via a network. For example, the user device 120 can communicate with the venue device 110 and/or the ticket server 130 via the Internet 140. The user device 120 can communicate with the Internet 140 via either a wired connection or a wireless connection.

An online ticket seller, such as StubHub, Inc. can have the ticket server 130. The ticket server 130 can facilitate online ticket sells. The ticket server 130 can have a processor 131 in communication with a memory 132. The processor 131 can be one or more processors. The processor 131 can access a user account 133 and a venue account 134 that are stored in the memory 132. The user account 133 can include information regarding the user, e.g., identification information, preferences, account numbers, and purchase history. The venue account 134 can include information regarding the venue, e.g., information regarding events, seating, and features. The memory 132 can be separate from the ticker server and can have any number of user accounts 133 and venue accounts 134. The memory 132 can be distributed, e.g., have portions thereof disposed at a plurality of different locations.

The ticket 130 server can be one or more servers located at one or more locations. Thus, the ticket server 130 can be geographically and operationally distributed. The ticker server 130 can be part of another system, such as a payment provider system.

The venue device 110 can communicate with the ticket server 130, such as via a network. For example, the venue device 110 can communicate with the ticket server 130 via the Internet 140. The venue device 110 can communicate with a plurality of different the payment servers 130. The ticket server 130 can communicate with a plurality of different the venue devices 110. A plurality of different ticket servers 130 can communicate among themselves and can be considered herein as being the same as a single ticket server 130. The user can utilize the user device 120 to interact with the ticket server 130 so that the user can purchase tickets online.

The ticket server 130 can communicate with the venue device 110 to obtain information regarding the venue. For example, the ticket server 130 can communicate with the venue device 110 to obtain information regarding the scheduling of events at the venue and regarding features of the venue. The features of the venue can be dependent upon the events of the venue, e.g., the features of the venue can vary from event to event.

FIGS. 2A-3E are flow charts that describe examples of operations of the venue seat and feature map system according to embodiments thereof. Note that one or more the steps described herein may be combined, omitted, or performed in a different order, as desired or appropriate.

Figure 2A:
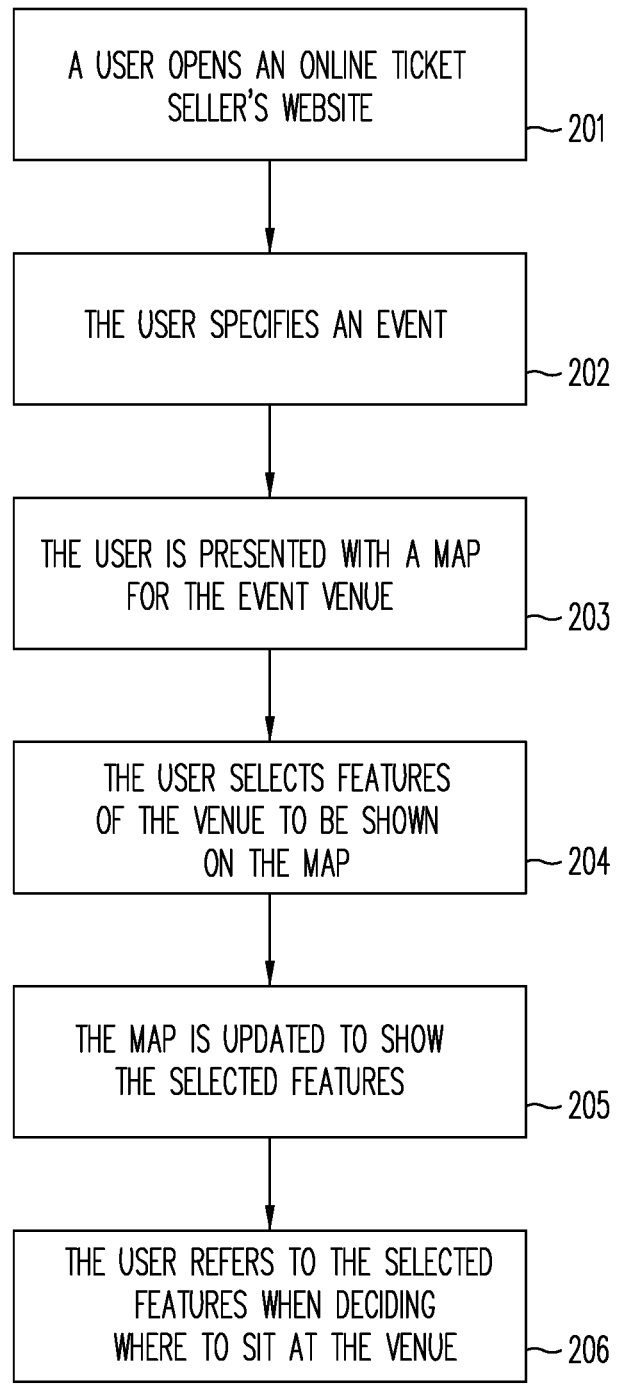
FIGS. 2A and 2B are flow charts showing a method for providing an interactive venue seat map, according to an embodiment.

FIG. 2A is a flow chart showing a method for providing the venue seat and feature map, according to an embodiment. A user who wants to purchase one or more tickets for an event can open an online ticket seller's website, as shown in step 201. The user can open the ticket seller's website using the user device 120, for example. The ticket seller's website can be hosted on the ticket server 130, the venue device 110, or on any other server or device.

The user can specify an event, as shown in step 202. The event can be a concert, sporting event, or any other type of event for which tickets are sold. The event can be specified by stating a name of the event, a venue, and/or a date. For example, the event of Metallica concert at Pacific Amphitheatre on Jun. 6, 2012 can be specified by entering "Metallica", "Pacific Amphitheatre" and/or "Jun. 6, 2012" in one or more entry boxes of the web site.

If the information entered is insufficient to uniquely identify the event, then the web site can present the user with a list of possible events. For example, if the user only entered "Metallica" without stating a date or venue, then a list of upcoming Metallic concerts (tour dates) can be presented for the user to choose from. In this way, the user can quickly find the event for which tickets are desired.

The user device 120 can provide GPS location information to the ticket server 130 and the ticket server 130 can be configured to limit the venues to one or more venues that are close to the location of the user device 120 when the user is attempting to specify the event. For example, if the user merely enters the word "Metallica" to identify an upcoming event and the GPS 123 of the user device 120 indicates that the user is in Los Angeles, then the ticket server 130 can present the user with the closest Los Angeles venue or all of the venues in Los Angeles.

The user can optionally be presented with only the next relevant event in the user's area. For example, if the user merely enters the word "Metallica" to identify the upcoming event, then the user can be presented with only the next Metallica concert at the closest venue to the user. The user can then be requested to verify that the desired event is being presented.

After the event has been uniquely identified, the user can be presented with a map for the event venue, as shown in step 203. The map can be shown on the web site. The map can show the different seating areas and their relationship to the attraction area, e.g., the stage, game court, or field. The map can be printed by the user, if desired. The ticket prices for each seating area can be provided.

The map can also show at least one venue feature. For example, the map can show escalators, elevators, wheel chair accesses, restaurants, drink stands, playgrounds, stores, parking lots, restrooms, and the like. The map can also show any desired features or combination of desired features.

The map can show a best route from a selected seat to a feature. For example, the map can show a best route from a selected seat to a parking area that is designated for use by the ticket holder for that seat. As a further example, the map can show a best route from a selected seat to the nearest restroom. The best route can be defined as the shortest route.

The best route can be defined by the user according to any desired user criteria. For example, the map can show a best route for a party that includes a person in a wheelchair. Such a best route can take advantage of elevators and wheel chair ramps. As a further example, the map can show a best route that passes by a restroom.

The map can show a best route from a selected seat to an alternate feature. For example, if the user knows that the lines are likely to be long at the closest restroom, then the user can have the best route to the next nearest restroom shown on the map.

The map can show alternate routes from a selected seat to a feature. For example, if the user knows that the shortest route to a drink stand is likely to be congested, then the user can have an alternate route, e.g., the next shortest route, to the same drink stand displayed.

The best route can be determined by the ticket server 130 and can be communicated to the user device 120. Alternatively, the best route can be determined by the user device 120. As a further alternative, the best route can be determined by the venue device 110. The best route can be determined by any desired device according to any desired criteria.

The user device 120 can be a mobile device and the map, as well as any or all of the features, can be stored on the user device 120. For example, the map can be used during the event to determine the location of a feature, the location of an alternative feature (such as the next closest restroom when the closest restroom is full), the best route to a feature, or the next best route to a feature.

The user can mark locations on the map, as desired. For example, the user can mark, high light, or drop a pin on the location of a friend's seat elsewhere in the venue. The user can mark any desired location on the map. The user can mark locations on the map for any desired purpose. For example, the user can mark locations on the map to show were features are located or to define the starting points and ending points of routes.

GPS or another location service or combination of services can provide instructions to the user for finding features or for following routes. For example, the app 125 of the user device 120 can provide verbal instructions, such as via earphone, for the user to follow such that the user does not need to view the map as the user moves about the venue. In this manner, the user can often view the event rather than look at the user device 102.

The map can show best routes or alternate routes from one feature to another feature. The map can show best routes or alternate routes from any place at the venue to any other place at the venue. The user can designate a starting point and an ending point for any such routes, such as by dropping pins on the map as displayed on the user device 120.

The user device 120 can be a mobile device and the map can be updated in real time. Thus, the map can be used in real-time to determine which feature to visit and can be used in real time to determine the best or an alternate route to the feature. Which feature to visit can be determined by taking into consideration factors such as brand preference (e.g., Coca Cola vs. Pepsi) and waiting lines. Brand preferences can be entered by the user during a setup process. The map can be updated in real time to show the status of features. For example, if a drink stand closes or runs out of inventory, a note can be provided on the map.

The map can be interactive. For example, in response to the user making a change on the map, such as adding or deleting a feature, the app 125 or the ticket server 130 can suggest one or more other changes. For example, if the user deletes a beer concession, the app 125 or the ticket server can suggest a nearby soft drink concession to be added.

The system can be anticipatory. For example, in response to the user adding a beer concession to the map, the app 125 or the ticket server 130 can suggest that a nearby restroom also be added. Thus, the system can determine future needs of the map based upon current use of the map.

The best route to a selected one of the features can be determined by taking into consideration such factors as distance to the feature and foot traffic congestion (as reported by human operators and/or machine vision). Any preferences regarding routing can also be considered. For example, the user can specify that all routes be less than a predetermined distance. The user might want to specify short routes of the user is disabled, unable to walk longer distances, or simply prefers to walk shorter distances.

The app 125 can use the GPS 123 and the clock of the user device 120 to determine that the user is at the venue. Prior to the event, the app 125 can automatically offer to show the user where to park, how to get to the seats, and where features such as the nearest concession stands and restrooms are, for example. After the event, the app 125 can offer to show the user the route to the parking lot, the nearest freeway, a destination (such as the user's home), or any other place.

The map can be a photographic map or virtual map. The map can thus show the actual features or a simulation of the actual features. The photographic may can be updated, such as in real time. The virtual map can be photorealistic.

The user can specify which venue features are to be shown on the map, as shown in step 204. The user can specify which venue features are to be shown on the map prior to the map being displayed on the web site. For example, the user can specify which venue features are to be shown on the map via the use of a menu, such as a drop down menu of the app 125.

The user can specify which venue features are to be shown after the map is displayed by the web site. For example, the user can specify which venue features are to be shown on the map via the use of a drop down menu that is provided on the map or along with the map. The venue features can be specified iteratively. That is, the venue features can be changed repeatedly until the user is satisfied with the features displayed.

The map can be update to show the selected features, as shown in step 205. Thus, each time that the user changes the features that are selected to be shown on the map, the map can be updated to shown the newly selected features. Such updating can be facilitated via communication between the user device 120 (from which the features can be selected) and the ticket server 130 (which can add the features to the map of the website displayed on the user device 120.

Alternatively, the ticket server 130 can download the map and all of the features to the user device 120 and the map can be changed by the user device 120 without requiring the continued cooperation of the ticket server 130. For example, an app 125 executed in the user device, a Java applet, or the like can facilitate changing of the features shown on the map without involvement of the ticket server 130. In this manner, network traffic can be minimized, bandwidth efficiency can be enhances, and the bandwidth requirements of the device 120 and/or the app 125 can be reduced.

The user can refer to the selected features when deciding where to sit at the venue, as shown in step 206. Thus, the user can display the features that are important to the user for deciding where to sit at a venue. The user can then determine which seats are close enough to those features to be desirable to the user and can select the seats on this basis. For example, if the user is going to bring children to the event, then the user may want to select seats near a playground. As a further example, if the user intends to eat during the event, the user may want to be near a restaurant, possible a particular restaurant such as a hotdog stand or pizza shop.

The user can specify that selected features be shown on the map only when grouped with a specified distance of one another. For example, the user can specify that the drink stands and restrooms be shown on the map only when the drink stands are within fifty feet of the restrooms.

Features such as restaurants and drink stands can be identified generically on the map. For example, the words "Restaurant" and "Drink Stand" can simply be used to indicate these features on the map. Alternatively, more descriptive terms can be used. For example, a name of the restaurant or a name of the products being sold can be shown on the map. For example, the words "Burger King Restaurant" or "Coca Cola Drink Stand" can be used. Any words, logos, designs, icons, or the like which indicate to the user what is at a location on the map can be used.

The user can choose to color code the features. For example, all food concessions can be color coded red, all drink concessions can be color coded blue, and all restrooms can be color coded green. Such color coding can help the user to quickly locate the desired feature, especially when the map is being displayed on the comparatively small screen of a mobile user device 120.

The user can define words, logos, designs, icons, or the like to be displayed upon the map for the features. Thus, the user can select such words, logos, designs, icons, or the like from words, logos, designs, icons, or the like presented by the website and/or can custom design words, logos, designs, icons, or the like for presentation on the map. For example, the user can select a Pepsi bottle from a list of graphic images to be used for all drink stands and can type the word "EATS" to be used for all restaurants. In this manner, the user can customize the maps, thus potentially making the event more appealing to the user and thereby increasing ticket sells for the online ticket seller.

The user can pre-define what features are to be shown on the map, such as during a setup process. This pre-definition of features to be shown on the map can then apply to all subsequently displayed maps. For example, the user can select restrooms and beer stands to be displayed on all future maps. Thus, any maps displayed by the venue seat and feature map in the future will automatically show the restrooms and beer stands in addition to the seating areas and attraction area.

The user can pre-define a plurality of different feature groups, such as during a setup process. Each feature group can contain a different set of features that are to be used for a different type of event. This, the user can pre-define one feature group for rock concerts and another feature group for monster truck rallies. For example, the user can pre-define one feature group containing drink stands and restrooms for the rock concerts and can pre-define another feature group containing playgrounds and souvenir shops for the monster truck rallies.

The venue seat and feature map system can automatically apply the pre-defined group for the user. Thus, when a map for a rock concert is being displayed, then the venue seat and feature map system can automatically apply the pre-defined group for rock concerts to the map. The user can then change which pre-defined group is to be use, if the user desires to do so. Alternatively, the user can select which pre-defined group is to be shown prior to the map being displayed.

This pre-definition of features to be shown on the map can then apply to all subsequently displayed maps. For example, the user can select restrooms and beer stands to be displayed on all future maps. Thus, any maps displayed by the venue seat and feature map in the future will automatically show the restrooms and beer stands in addition to the seating areas and attraction area.

Any such customization or pre-definition of features to be shown on a map can last indefinitely or can last for a pre-determined amount of time. Such customization or pre-definition of features to be shown on a map can last for a day, a week month, a season, a year, multiple years, or any other length of time. For example, a season ticket holder may set up a custom map for a baseball team that only applies when that particular baseball team is playing and that defines the features to be shown on the map and the words or graphics to be displayed to indicate each feature. Other custom maps can be user by the season ticket holder for basketball games and football games.

When the map is initially sent to the user, the map can show all of the features available for the event, some of the features available for the event, or none of the features available for the event. The user can subsequently define which of the features available for the event the user desires to see on the map and the map can be changed to show only the desired features.

Figure 2B:
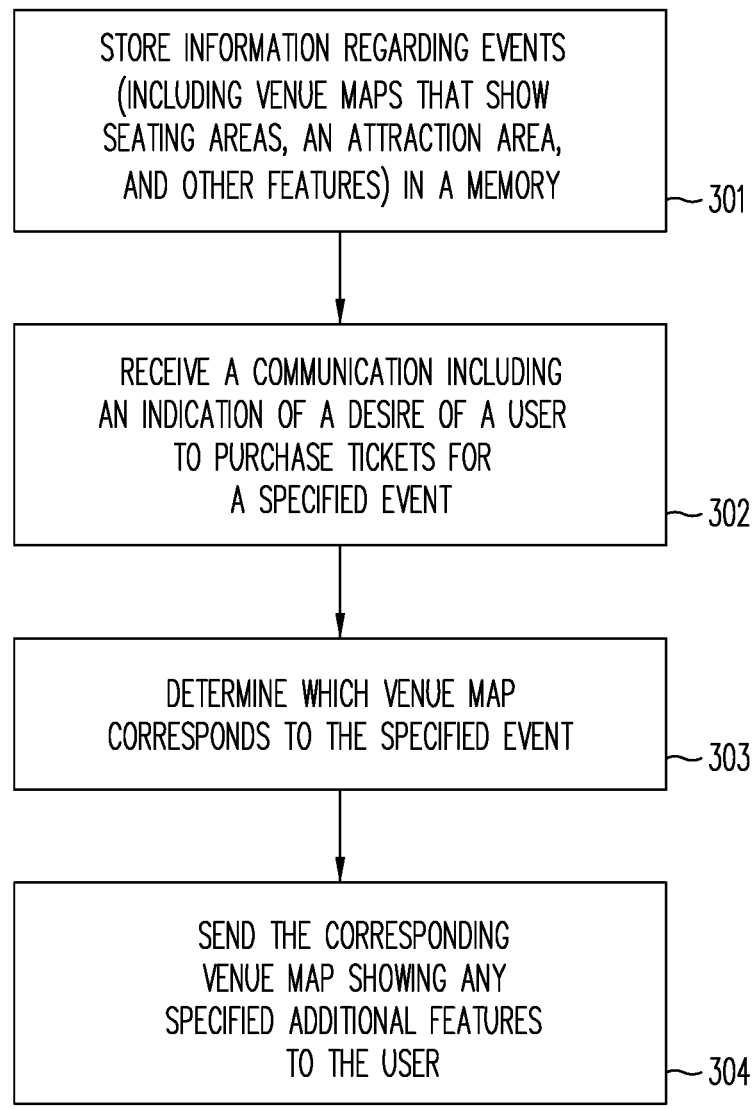

FIG. 2B is a flow chart showing further detail of the method for the venue seat and feature map, according to an embodiment. A ticket server 130 can store information regarding events in a memory 132, as shown in step 301. The information can include venue maps that show seating areas and an attraction area such as a stage, court or field. Information regarding features of the venue can be stored in the memory 132. For example, information regarding the location, routes to, and items sold by stores, drink stands, shops, and the like can be stored in the memory 132. Information regarding which events at the each venue will utilize such features can be stored in the memory 132.

The ticket server 130 can receive a communication that includes an indication of a desire of the user to purchase tickets for a specified event, as shown in step 302. For example, the user can open the app 125 on the user device 120. The app 125 can initiate communication with the ticket server 130. From the app 125, the user can select the event for which the user desires to purchase tickets. Generally, the event will be defined by specifying an attraction, e.g., a performer or a team, a venue, and/or a date.

The user can access a web site of the online ticket seller, with or without using the app 125. The user can select the event for which the user desires to purchase tickets, can specify the features, and can view the map via the web site.

The ticket server 130 can determine which map corresponds to the specified even, as shown in step 303. The ticket server 130 can determine which map corresponds to the specified event via a data base stored in the memory 132, for example. The ticket server 130 can send the map, showing any specified features, to the user as shown in step 304.

Figure 3A:
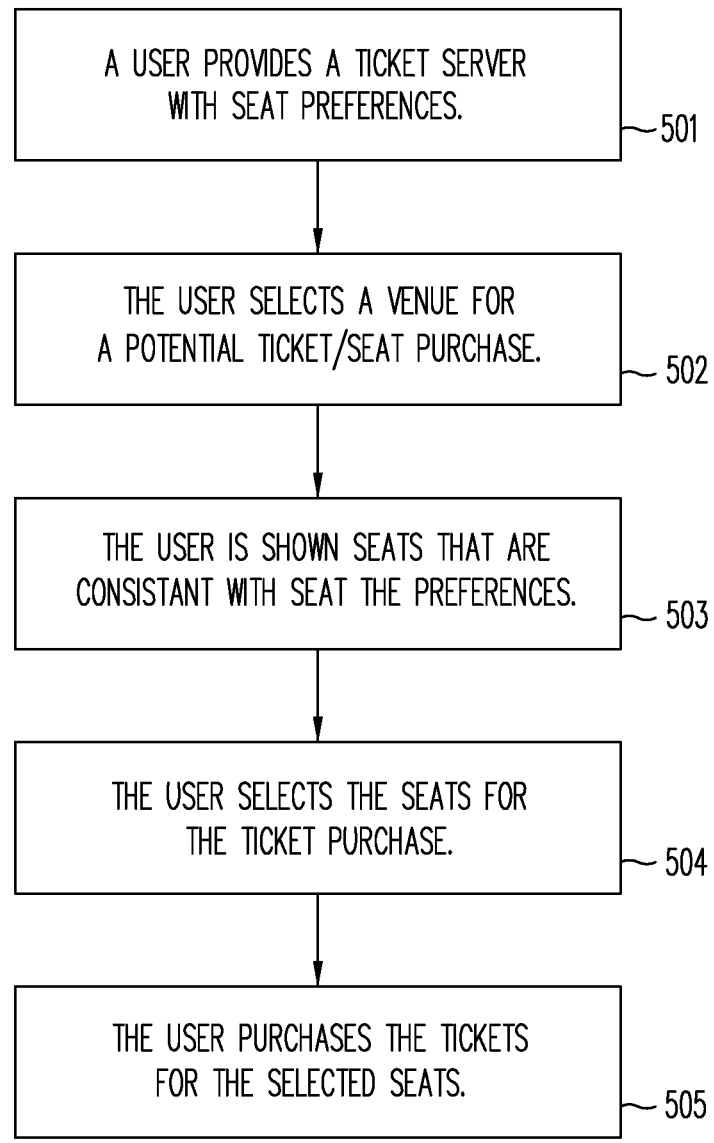
FIGS. 3A-3E are a flow charts showing further detail of the method for providing an interactive venue seat map, according to an embodiment.

FIG. 3A shows a flow chart having additional detail regarding the user preferred venue seating wherein the user provides the ticket server 130 with user seating preferences, according to an embodiment. A user can provide the ticket server 130 with seat preferences, as shown in step 501. For example, the seat preferences can be provided to the ticket server 130 during a seating preferences setup procedure performed by the user, such as when setting up an account with the ticket seller.

The user can select a venue/event for a potential ticket or seat purchase, as shown in step 502. The venue/event selection can be part of a ticket purchase that is performed in cooperation between the user and the ticket seller, such as via the user device 120 and the ticket server 130.

The user can be shown seats that are consistent with the seat preferences provided by the user, as shown in step 503. The seats can be shown to the user by the ticket server 130. The seats can be shown as text, graphics, or any combination of text and graphics. For example, the seats can be shown on a map of the venue with those seats that are consistent with the seat preferences being highlighted.

The user can select the seats for the ticket purchase, as shown in step 504. The user can select the seats by filling out a form, e.g., entering text, or by selecting the seats, e.g., with a cursor or by touching a touch screen.

The user can purchase the tickets, as shown in step 505. The purchase can be done either online or at a brick and mortar ticket outlet. The purchase can be done online by confirming with the ticket server 130 that the user wants to make the purchase.

Figure 3B:
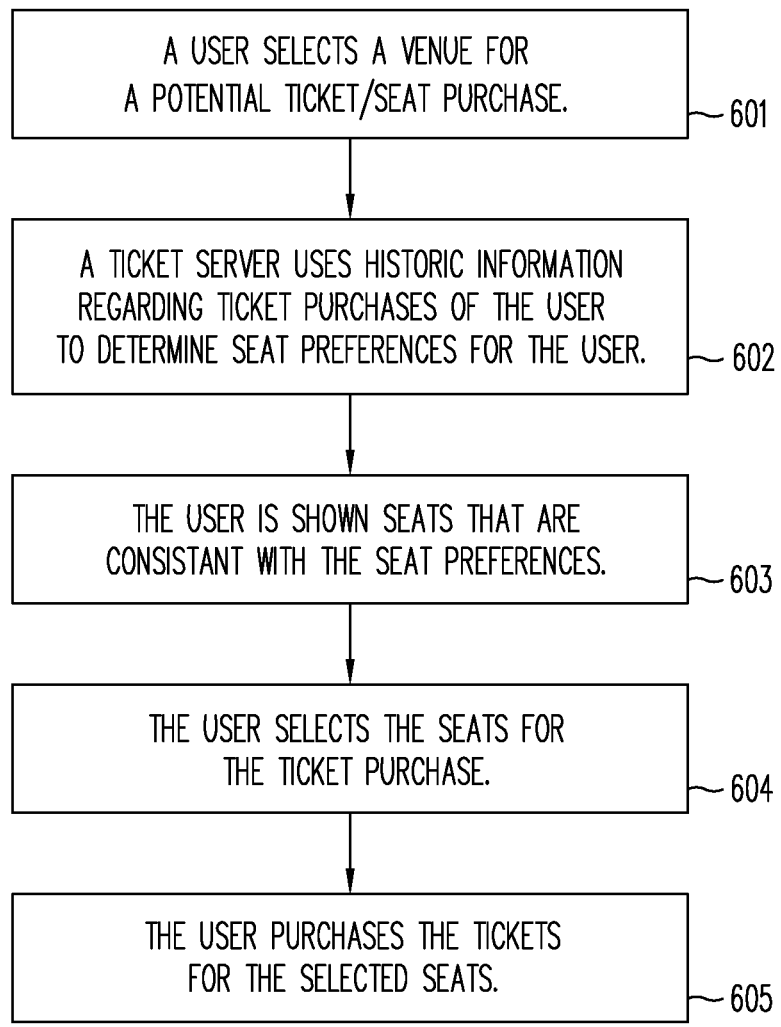

FIG. 3B shows a flow chart having additional detail regarding the user preferred venue seating wherein the ticket server 130 determines user seating preferences from user historic seating information, according to an embodiment. The user can select a venue/event for a potential ticket or seat purchase, as shown in step 601. The venue/event selection can be part of a ticket purchase that is performed in cooperation between the user and the ticket cip seller, such as via the user device 120 and the ticket server 130.

The ticket server 130 can use historic information regarding ticket purchases of the user to determine seat preferences for the user, as shown in step 602. For example, if the user has always selected a particular seating area in the past, this particular area can be considered to be a preferred seating area for the user. Any criteria can be used to determine preferences from historic information.

The user can be shown seats that are consistent with the seat preferences provided by the user, as shown in step 603. The seats can be shown to the user by the ticket server 130. The seats can be shown as text, graphics, or any combination of text and graphics. For example, the seats can be shown on a map of the venue with those seats that are consistent with the seat preferences being highlighted.

The user can select the seats for the ticket purchase, as shown in step 604. The user can select the seats by filling out a form, e.g., entering text, or by selecting the seats, e.g., with a cursor or by touching a touch screen.

The user can purchase the tickets, as shown in step 605. The purchase can be done either online or at a brick and mortar ticket outlet. The purchase can be done online by confirming with the ticket server 130 that the user wants to make the purchase.

In implementation of the various embodiments, embodiments of the invention may comprise a personal computing device, such as a personal computer, laptop, PDA, cellular phone or other personal computing or communication devices. The online ticket seller may comprise a network computing device, such as a server or a plurality of servers, computers, or processors, combined to define a computer system or network to provide the online ticket sales.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 3C:
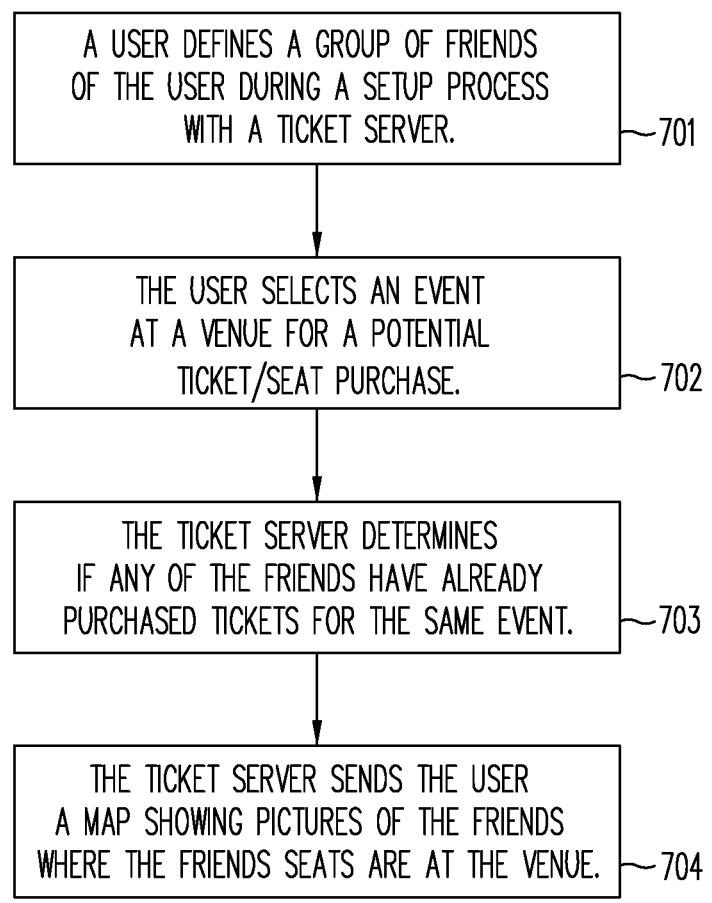

FIG. 3C is a flowchart showing a method for providing interactive venue seat maps, according to an embodiment. A user can define a group of friends of the user during a setup process with a ticket server 130, as shown in step 701. That is, the user can enter the list of friend into the system, such as during the setup process with the ticket server 130. The list of friends can be stored in the user account 133. The list of friends can be modified by the user at any time after the setup process.

After the setup process has been completed, the user can select an event at a venue for a potential ticket/seat purchase, as shown in step 702. The ticket server 130 can determine if any of the friends have already purchased tickets for the same event, as shown in step 703.

If any of the friends have already purchased tickets for the same event, then the ticket server 130 can send the user a map showing pictures of the friends where the friends seats are at the venue, as shown in step 704. The pictures can be omitted and text names of the friends can be shown on the map instead.

If the user purchases tickets to the event, then when additional friends of the user are later purchasing tickets for the same event, the additional friends can be notified that the friends are sitting together. Thus, the additional friends can be given an opportunity to sit with the group.

Figure 3D:
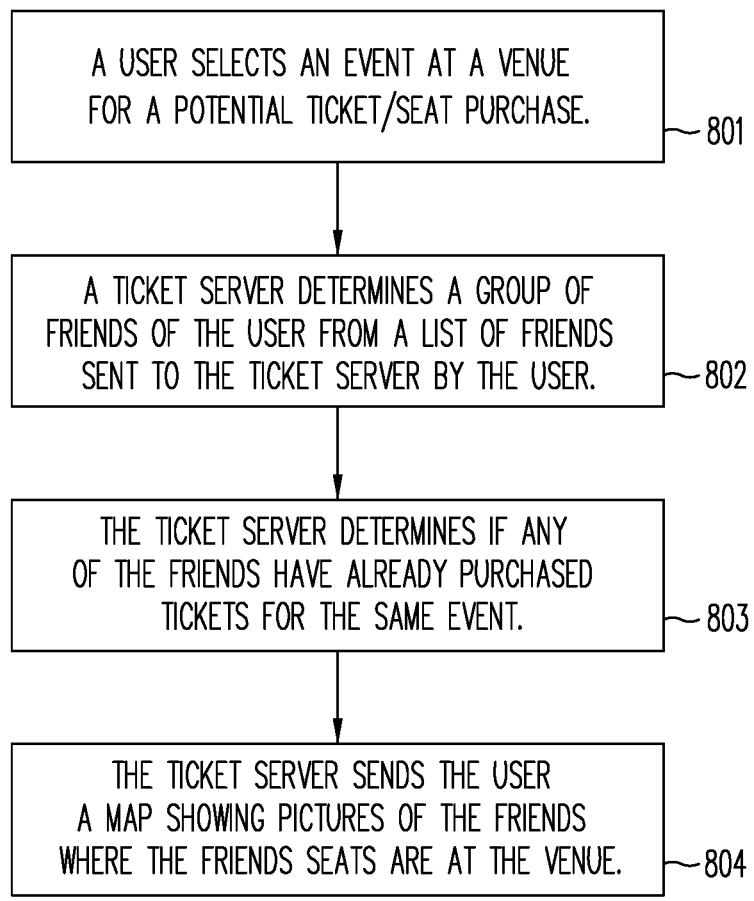

FIG. 3D is a flowchart showing further details of a method for providing interactive venue seat maps, according to an embodiment. The user can select an event at a venue for a potential ticket/seat purchase, as shown in step 801. The ticket server 130 can determine a group of friends of the user from a list of friends sent to the ticket server 130 by the user, as shown in step 802.

The ticket server 130 can determine if any of the friends have already purchased tickets for the same event, as shown in step 803. If any of the friends have already purchased tickets for the same event, then the ticket server 130 can send the user a map showing pictures of the friends where the friends seats are at the venue, as shown in step 804. The pictures can be omitted and text names of the friends can be shown on the map instead.

Figure 3E:
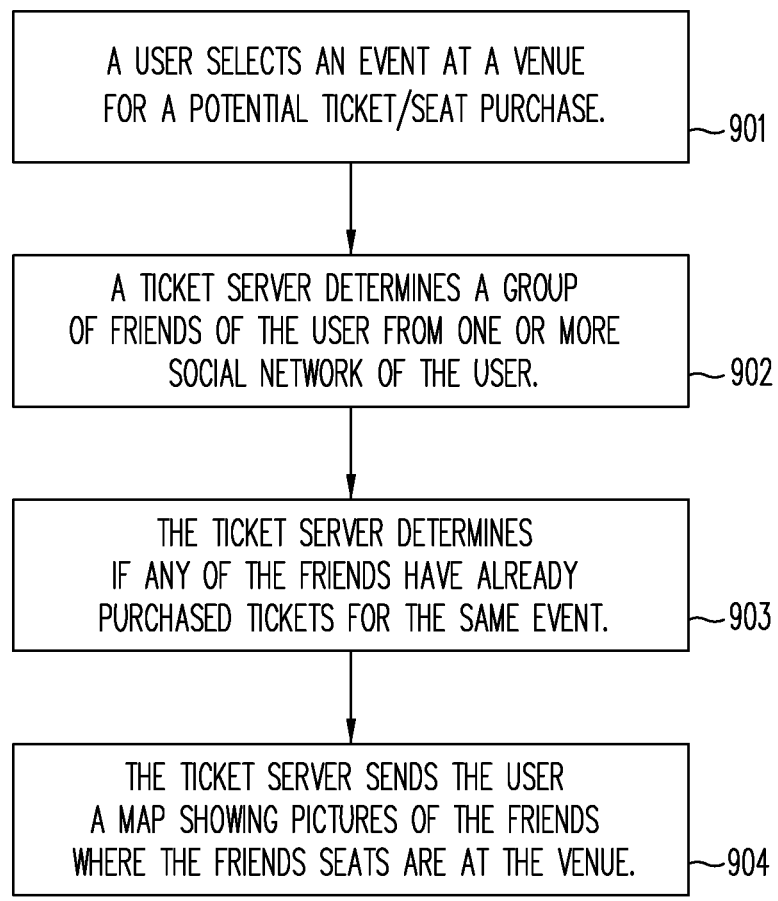

FIG. 3E is a flowchart showing further details of a method for providing interactive venue seat maps, according to an embodiment. The user selects an event at a venue for a potential ticket/seat purchase, as shown in step 901. The ticket server 130 can determine a group of friends of the user from one or more social networks of the user, as shown in step 902. The ticket server 130 can query a server of the social network or the social network can report the group of friends to the ticket server 130.

The ticket server 130 can determine a group of friends of the user from one or more lists of contacts of the user, such as from Contact List (an address book provided by Yahoo! Inc.). The ticket server 130 can determine a group of friends of the user from any combination of social networks, contact lists, user input, or by any other method.

The ticket server 130 can determine if any of the friends have already purchased tickets for the same event, as shown in step 903. If any of the friends have already purchased tickets for the same event, then the ticket server 130 can send the user a map showing pictures of the friends where the friends seats are at the venue, as shown in step 904. The pictures can be omitted and text names of the friends can be shown on the map instead.

The user can define a plurality of different lists of friends, e.g., a plurality of different groups. For example, one group can include the user's immediate family, another group can include the user's friends, and yet another group can include the user's co-workers.

The map can show people who the user does not want to sit near. For example, the map can show the user's ex-wife, the ex-wife' s husband, and the user's brother-in-law. The people who the user does not want to sit near or someone else in the group does not want to sit near can be color coded differently from those people who the user does want to sit near. For example, pictures of both the people who the user wants to sit near and the people who the user does not want to sit near can be shown on the map with different colored backgrounds in the pictures. Thus, the people who the user wants to sit near can have pictures with blue backgrounds and the people who the user does not want to sit near can have red backgrounds. As a further example, a large "X" can be placed over the picture of any person that the user does not want to sit near.

Groups of people can be split into sub groups. The groups of people can be split into sub groups after the groups have been defined and can be split into sub group on an ad hoc basis. For example, while attending a particular event, the two parents may want to sit separately from their children. A pre-define family group can be temporarily split (for this one event only) or permanently split (for all future events) into separate groups.

Within a group, seating can be optimized. For example, husbands and wives can sit together and children can sit together. Any desired sets of people can be defined to sit in any desired configuration. Taller people can sit behind shorter people. Older people can sit behind younger people. Chaperones can sit where they can view those being chaperoned. Anyone wanting an isle seat can sit at or near an isle. Any desired specific seating arrangement can be stored in the ticket server 130 and can be applied to any desired group, either on a group by group basis, to some groups, or to all groups. Any desired rule for defining seating arrangements can be stored in the ticket server and applied to any desired group, either on a group by group basis, to some groups, or to all groups.

Requests can be made, such as by the user or the ticket server 130, for seating changes for those who have already purchase tickets. For example, if some members of a user's group have already purchased tickets for seats that are not where the user would like for the seat to be, then the user can, via the system, request that the group members or that the system change the seats. The system can be configured to make such changes automatically and to notify the people whose seats were changed. Members of a group can authorize such automatic seating reassignment in advance.

Rules can be agreed upon in advance to resolve conflicts that occur when one user's seating desires are inconsistent with another user's seating desires. For example, one user can want a particular person to sit with that user in one part of the venue, while a different user can want the same person to sit with the different user in a different part of the venue. The two users can resolve the conflict among themselves or the ticket servers can resolve the conflict according to pre-defined conflict resolution rules.

Thus, the system can tend to optimize seating dynamically, as more users of the system purchase tickets. The user can define or agree to rules for attempting to optimize seating during a setup procedure.

For example, such rules can include:

1. How to seat individuals (taller behind shorter, etc.)
2. How to resolve conflicts (first come, first serve, random flip of a coin, etc.)
3. Exceptions to rules.
4. Notification to user in certain events (children purchasing tickets to concerts, etc.)
5. Group notifications regarding changes to seating, the event, local accommodations, etc.

The system can facilitate sending of messages (such as text messages, emails, or voice messages) to members of a group wherein the messages suggest seating changes to better tend to optimize seating, such as according to pre-defined rules. The system can include a plurality of seating suggestions or options to at least some of the group.

The system can use one or more social networks to try to coordinate or optimize seating. The system can send to members of a group via such social networks, wherein the messages suggest seating changes to better tend to optimize seating, such as according to pre-defined rules.

The user can change any rules or other aspects of the system interactively or dynamically. Thus, the user can redefine the groups, the rules, or the seating arrangements, as desired. The user can appoint one or more sub users who can act as the user, with either full or limited capacity.

The user can re-assign seats. Thus, the system can suggest a seating arrangement and the user can fine tune the seating arrangement, as desired. The user can have the final say over the system with respect to seat assignments. Any sub users can have full or limited say over the system with respect to seat assignments.

The group can be moved, in mass, from one location in the venue to another location in the venue. The system can attempt to maintain or enforce any rules by which the seating was originally defined when the group is moved. The system can apply new any rules when the group is moved. For example, if the group is move farther away from a stage, then those with better sight or hearing can be seating front of those with worse sight or hearing.

Figure 4:
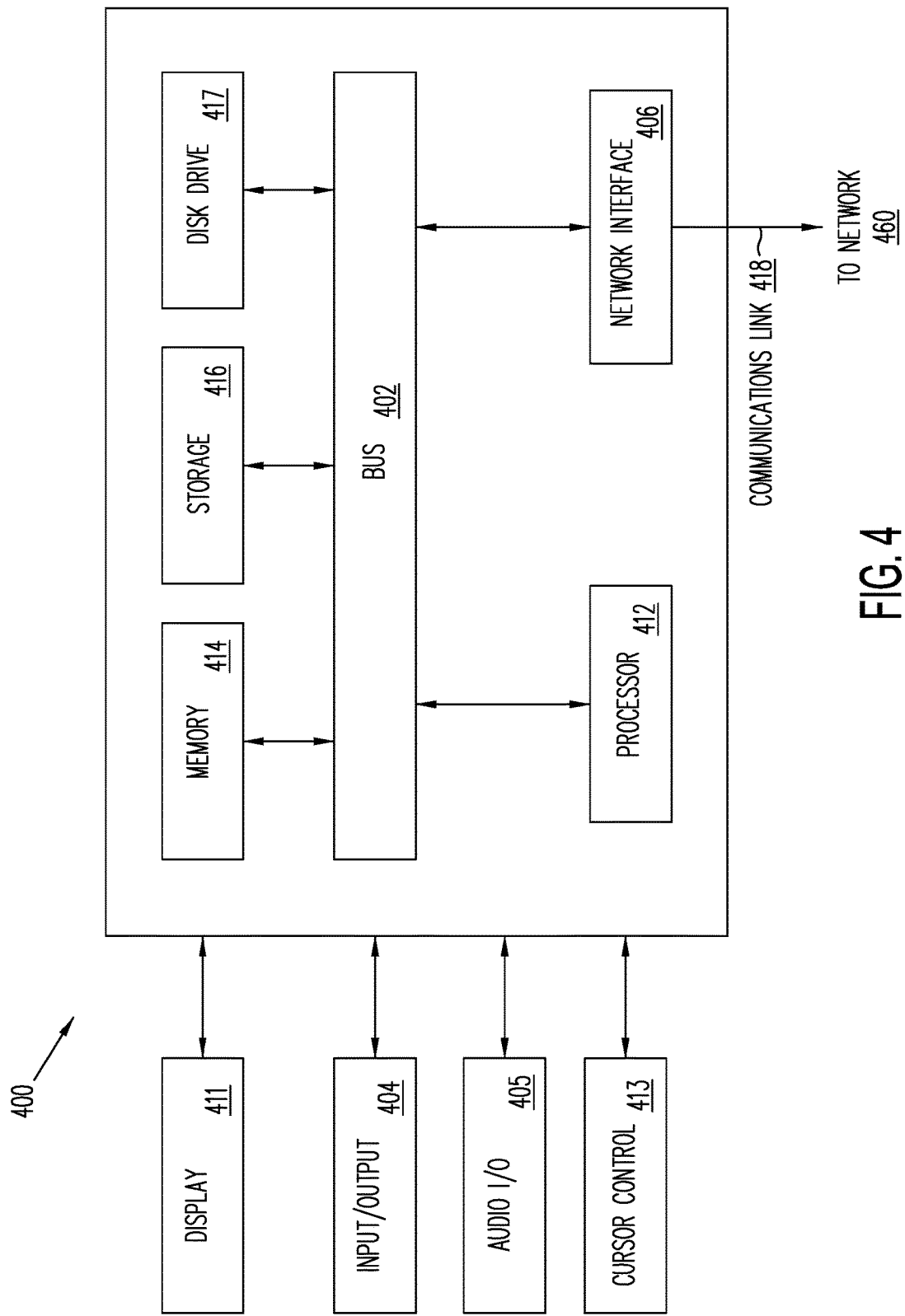
FIG. 4 is a block diagram of an example of a computer that is suitable for use in the system for providing an interactive venue seat map, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The embodiments and features disclosed herein can be combined in any desired manner. Thus, a single map can be provided that shows user preferences (such as elevators, food stands, restrooms, etc.), user preferred seating (such as within a specified distance from a stage), and the seating of friends at the venue. The map can be interactive, such that items can be added to or removed from the map, as desired by the user.

As used herein, the term "store" can include any business or place of business. The store can be a brick and mortar store or an online store. The store can be any person or entity that sells a product.

As used herein, the term "product" can include any item or service. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "attraction area" can include any area, stage, field, court, or other structure or area when performers, players, or the like perform or play. The term "attraction area" can include any place that the spectators desire to view at the venue.

As used herein, the term "game field/court" can include any field, court, arena, or other structure or area when a game is played.

As used herein, the term "restaurant" can include any restaurant, coffee shop, café, deli, sandwich shop, or any other place that sells food or beverages.

As used herein, the term "drink stand" can include any place where any beverage is sold.

As used herein, the term "playground" can include any place that has toys, swings, slides, or other things for children to play on or with. The term "playground" can be included any place where children are expected to play.

As used herein, the term "store" can include any souvenir shop, gift shop, or other place where a user can shop. As used herein, the term "store" can include any place where products are sold.

As used herein, the term "friend" can include friends, family members, co-workers, club members, church members, or the like. The term "friend" can include members of any group. The term "friend" can include anyone that the user wants the term to include, e.g., anyone who the user wants to sit with or know the location of a seat of at a venue.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A computing device comprising:
a global positioning system (GPS) chip;
a display;
one or more processors coupled to the display and the GPS chip; and
one or more computer-readable media coupled to the one or more processors, the one or more computer-readable media containing instructions that, when executed by the one or more processors, cause the computing device to perform operations, the operations comprising:

obtaining an interactive map of a venue, the interactive map including one or more user-selectable venue features;
directing the display to display the interactive map;
receiving user input selecting a first feature of the one or more user-selectable venue features;
based on the user input, automatically identifying a second feature related to the first feature;
obtaining current foot traffic congestion data for the venue;
in response to the GPS chip indicating that the computing device has arrived at the venue, calculating a route from a current location of the computing device to at least the second feature based on the current foot traffic congestion data and the current location of the computing device as determined via the GPS chip; and
directing the display to display the route on the interactive map.

2. The computing device of claim 1, further comprising a wireless communication device coupled to the one or more processors and configured to receive the interactive map from a server, wherein
the one or more user-selectable venue features including:
a first plurality of features configured to be displayed by the display by default, and
a second plurality of features configured not to be displayed by the display by default.

3. The computing device of claim 1, wherein the interactive map is obtained before the GPS chip indicates that the computing device has arrived at the venue.

4. The computing device of claim 1, wherein the current foot traffic congestion data is obtained from a computing system associated with the venue.

5. The computing device of claim 4, wherein the current foot traffic congestion data is one of designated as being obtained by a report of a human operator, or designated as being obtained by machine vision.

6. The computing device of claim 1, wherein the route is further calculated based on at least one of: a user preference regarding a route length, a brand preference, or an efficiency preference of reducing a combination of walking times and wait times.

7. The computing device of claim 1, wherein the route is further calculated based on a wait time for the one or more user-selectable venue features.

8. The computing device of claim 1, wherein the operations further comprise: receiving a user interaction with the interactive map deselecting a first venue feature displayed on the interactive map; and
in response to the user interaction, removing the first venue feature and adding a second venue feature related to the first venue feature, the second venue feature not displayed on the interactive map before receiving the user interaction.

9. The computing device of claim 1, wherein the operations further comprise receiving a user interaction with the interactive map selecting the at least one of the one or more user-selectable venue features, and
wherein the route is calculated in response to the user interaction.

10. The computing device of claim 1, wherein the route includes a path that includes the current location, the first feature, and the second feature, the second feature being displayed in the interactive map of the venue in response to the automatic identification of the second feature.

11. The computing device of claim 1, wherein the route includes a path that includes the current location and the second feature, and excludes the first feature, the interactive map of the venue ceasing display of the first feature in response to the user input.

12. A method comprising:
obtaining an interactive map of a venue by a computing device, the interactive map including one or more user-selectable venue features;
displaying the interactive map on the computing device;
receiving user input selecting a first feature of the one or more user-selectable venue features;
based on the user input, automatically identifying a second feature related to the first feature;
obtaining current foot traffic congestion data for the venue;
based on the current foot traffic congestion data and a current location of the computing device as determined via a global positioning system (GPS) chip of the computing device, and in response to the GPS chip indicating that the computing device has arrived at the venue, calculating a route from the current location to at least the second feature; and
displaying the route on the interactive map.

13. The method of claim 12, wherein:
obtaining an interactive map comprises receiving the interactive map from a server, the one or more user-selectable venue features including a first plurality of features and a second plurality of features; and
displaying the interactive map comprises displaying the first plurality of features by default, and not displaying the second plurality of features by default.

14. The method of claim 12, further comprising:
determining via the GPS chip that the computing device has arrived at the venue, wherein the interactive map is obtained before it is determined that the computing device has arrived at the venue.

15. The method of claim 12, wherein obtaining current foot traffic congestion data comprises receiving the current foot traffic congestion data from a computing system associated with the venue.

16. The method of claim 15, wherein the current foot traffic congestion data is obtained at the computing system associated with the venue by one of a report by a human operator, or by machine vision.

17. The method of claim 12, wherein the route is further calculated based on at least one of a user preference regarding a route length, a brand preference, or an efficiency preference of reducing a combination of walking times and wait times.

18. The method of claim 12, wherein the route is further calculated based on a wait time for the one or more user-selectable venue features.

19. One or more non-transitory computer-readable media containing instructions that, when executed by one or more processors, cause a computing device to perform operations, the operations comprising:
obtaining an interactive map of a venue from a second computing device, the interactive map including one or more user selectable venue features;
directing a display of the computing device to display the interactive map;
receiving user input selecting a first feature of the one or more user selectable venue features;
based on the user input, automatically identifying a second feature related to the first feature;
obtaining current foot traffic congestion data for the venue from the second computing device, the second computing device configured to obtain current foot traffic in one or more areas of the venue;
in response to a GPS chip of the computing device indicating that the computing device has arrived at the venue, calculating a route from a current location of the computing device to at least the second feature based on the current foot traffic congestion data and the current location of the computing device as determined via the GPS chip; and
directing the display to display the route on the interactive map.

20. The one or more non-transitory computer-readable media of claim 19, wherein: the one or more user-selectable venue features including a first plurality of features configured to be displayed by the display by default, and a second plurality of features configured not to be displayed by the display by default; and the computing device is configured to obtain the interactive map before the GPS chip indicates that the computing device has arrived at the venue.

* * * * *